US010114206B2

(12) United States Patent
Dixon

(10) Patent No.: US 10,114,206 B2
(45) Date of Patent: Oct. 30, 2018

(54) MICROSCOPY SLIDE SCANNER WITH VARIABLE MAGNIFICATION

(71) Applicant: Huron Technologies International Inc., Waterloo (CA)

(72) Inventor: Arthur Edward Dixon, Waterloo (CA)

(73) Assignee: HURON TECHNOLOGIES INTERNATIONAL INC., St. Jacob's, Ontario (CA)

(*) Notice: Subject to any disclaimer, the term of this patent is extended or adjusted under 35 U.S.C. 154(b) by 388 days.

(21) Appl. No.: 14/770,427

(22) PCT Filed: Feb. 25, 2014

(86) PCT No.: PCT/CA2014/000153
§ 371 (c)(1),
(2) Date: Aug. 25, 2015

(87) PCT Pub. No.: WO2014/127468
PCT Pub. Date: Aug. 28, 2014

(65) Prior Publication Data
US 2016/0004062 A1 Jan. 7, 2016

Related U.S. Application Data

(60) Provisional application No. 61/768,880, filed on Feb. 25, 2013.

(51) Int. Cl.
H04N 7/18 (2006.01)
H04N 9/47 (2006.01)
G02B 21/36 (2006.01)
G02B 21/08 (2006.01)
G02B 21/16 (2006.01)
(Continued)

(52) U.S. Cl.
CPC .......... *G02B 21/36* (2013.01); *G02B 21/025* (2013.01); *G02B 21/082* (2013.01); *G02B 21/16* (2013.01); *G06T 3/4038* (2013.01); *G06T 7/11* (2017.01); *G06T 7/187* (2017.01); *G06T 7/20* (2013.01); *G06T 7/90* (2017.01); *H04N 5/23296* (2013.01); *H04N 5/372* (2013.01); *H04N 5/374* (2013.01); *H04N 7/183* (2013.01); *G06T 2207/10024* (2013.01); *G06T 2207/10061* (2013.01); *G06T 2207/10064* (2013.01);
(Continued)

(58) Field of Classification Search
None
See application file for complete search history.

(56) References Cited

U.S. PATENT DOCUMENTS

2009/0059386 A1* 3/2009 Liao .................... G02B 21/025
359/660
2009/0080065 A1* 3/2009 Shafer ................. G02B 17/023
359/354

(Continued)

*Primary Examiner* — Talha M Nawaz
(74) *Attorney, Agent, or Firm* — Daryl W. Schnurr; Miller Thornson LLP

(57) ABSTRACT

An instrument and a method of scanning a large microscope specimen moves the specimen relative to a detector array during scanning by a scanner. Magnification of the instrument is adjustable using a zoom tube lens over a continuous range of magnification to enable scans of the specimen to be taken over a range of resolutions without varying the infinity corrective objective. Scans of the specimen can be taken over a range of resolutions with the same infinity connected objective.

40 Claims, 8 Drawing Sheets

(51) Int. Cl.
*G02B 21/02* (2006.01)
*G06T 3/40* (2006.01)
*G06T 7/20* (2017.01)
*H04N 5/232* (2006.01)
*H04N 5/372* (2011.01)
*H04N 5/374* (2011.01)
*G06T 7/11* (2017.01)
*G06T 7/90* (2017.01)
*G06T 7/187* (2017.01)

(52) U.S. Cl.
CPC ............... *G06T 2207/10144* (2013.01); *G06T 2207/30004* (2013.01); *G06T 2210/41* (2013.01)

(56) References Cited

U.S. PATENT DOCUMENTS

| | | | | |
|---|---|---|---|---|
| 2011/0064296 | A1* | 3/2011 | Dixon | G01N 21/6428 382/133 |
| 2013/0342674 | A1* | 12/2013 | Dixon | G02B 21/36 348/79 |
| 2014/0125776 | A1* | 5/2014 | Damaskinos | G02B 21/365 348/50 |
| 2014/0219346 | A1* | 8/2014 | Ugur | H04N 19/00575 375/240.12 |
| 2014/0226866 | A1* | 8/2014 | Crandall | G01N 21/274 382/107 |
| 2015/0054921 | A1* | 2/2015 | Dixon | G02B 21/26 348/46 |

\* cited by examiner

MICROSCOPY SLIDE SCANNER WITH VARIABLE MAGNIFICATION

BACKGROUND OF THE INVENTION

Field of the Invention

This invention relates to the fields of microscopic imaging of large specimens with particular emphasis on brightfield and fluorescence imaging, including photoluminescence and spectrally-resolved fluorescence. Applications include imaging tissue specimens, genetic microarrays, protein arrays, tissue arrays, cells and cell populations, biochips, arrays of biomolecules, detection of nanoparticles, photoluminescence imaging of semiconductor materials and devices, and many others. More particularly, this invention relates to an instrument and method in which a magnification of the instrument can be varied while using the same infinity connected objective.

Description of the Prior Art

Strip-scanning instruments are used for imaging large microscopy specimens. In these instruments infinity-corrected microscope optics are used, with a high Numerical Aperture (high NA) microscope objective and a tube lens to focus an image of the specimen directly onto a CCD or CMOS linear array sensor or TDI linear array sensor. A linear CCD detector array with 1000 or 2000 pixels is often used, and three separate linear detectors with appropriate filters to pass red, green and blue light are used for RGB brightfield imaging. The sample is moved at constant speed in the direction perpendicular to the long dimension of the linear detector array to scan a narrow strip across a microscope slide. The entire slide can be imaged by scanning contiguous strips and assembling them (by butting strips together or stitching them together) to create a final image. One strip-scanning instrument uses linear TDI (Time Delay Integration) array sensors which increase both sensitivity and imaging speed. In both of these instruments, exposure is varied by changing illumination intensity and/or scan speed.

A strip-scanning microscope for brightfield imaging that uses a linear-array detector is shown in FIG. 1 (Prior Art). A tissue specimen 100 (or other specimen to be imaged) mounted on microscope slide 101 is illuminated from below by illumination source 110. Light passing through the specimen is collected by infinity-corrected microscope objective 115 which is focused on the specimen by piezo positioner 120. The microscope objective 115 and tube lens 125 form a real image of the specimen on linear detector array 130. An image of the specimen is collected by moving the microscope slide at constant speed using motorized stage 105 in a direction perpendicular to the long dimension of the detector array 130, combining a sequence of equally-spaced line images from the array to construct an image of one strip across the specimen. Strips are then assembled to form a complete image of the specimen.

Fluorescence microscopy is usually performed using illumination from the same side as detection (epifluorescence). If the specimen were illuminated from below, as in a brightfield microscope, some of the bright illumination light passing through the specimen could enter the detector and compete with the fluorescence signals, which are comparatively weak. Because fluorescence signals are weak, a TDI linear array detector is often used instead of an ordinary linear array detector.

A prior art scanning microscope for fluorescence imaging is shown in FIG. 2. A tissue specimen 100 (or other specimen to be imaged) mounted on microscope slide 101 is illuminated from above by illumination source 200. In fluorescence imaging the illumination source is usually mounted above the specimen (epifluorescence) so that the intense illumination light that passes through the specimen is not mixed with the weaker fluorescence emission from the specimen, as it would be if the illumination source were below the specimen. Several different optical combinations can be used for epifluorescence illumination—including illumination light that is injected into the microscope tube between the microscope objective and the tube lens, using a dichroic beamsplitter to reflect it down through the microscope objective and onto the specimen. A narrow wavelength band for the illumination light is chosen to match the absorption peak of the fluorophore in use. Fluorescence emitted by the specimen is collected by infinity-corrected microscope objective 115 which is focused on the specimen by piezo positioner 120. Emission filter 205 is chosen to reject light at the illumination wavelength and to pass the emission band of the fluorophore in use. The microscope objective 115 and tube lens 125 form a real image of the specimen on TDI detector array 210. An image of the specimen is collected by moving the microscope slide at constant speed using motorized stage 105 in a direction perpendicular to the long dimension of the detector array 210, acquiring a sequence of equally-spaced, time-integrated line images from the array to construct an image of one strip across the specimen. Strips are then assembled to form a complete image of the specimen. When a TDI linear array detector is used, each line image is the result of integrating the charge generated in all of the previous lines of the array while the scan proceeds, and thus has both increased signal/noise and amplitude (due to increased exposure time) when compared to the result from a linear array detector.

A description of strip scanning instruments, using either linear arrays or TDI arrays, is given in U.S. Pat. No. 8,055,042 B2 ("Fully Automatic Rapid Microscope Slide Scanner", by Dirk Soenksen).

A prior art strip scanning instrument for fluorescence and brightfield imaging using an area detector array and Moving Specimen Image Averaging (MSIA) is shown in FIG. 3 (see WO 2012/083438 A1). A tissue specimen 100 (or other specimen to be imaged) is mounted on microscope slide 101 on a scanning stage 105. When used for fluorescence imaging, the tissue specimen is illuminated from above by illumination source 310, mounted above the specimen (epifluorescence) so that the intense illumination light that passes through the specimen is not mixed with the weaker fluorescence emission from the specimen, as it would be if the fluorescence illumination source were below the specimen. Several different optical combinations can be used for epifluorescence illumination—light from a source mounted on the microscope objective, as shown; illumination light that is injected into the microscope tube between the microscope objective and the tube lens, imaged onto the back aperture of the objective, using a dichroic beamsplitter to reflect it down through the microscope objective and onto the specimen; and several others. A narrow wavelength band for the illumination light is chosen to match the absorption peak of the fluorophore in use. This narrow-band illumination may come from a filtered white-light source, an LED or laser-based source (including a laser sent through a diffuser plate in rapid motion to eliminate speckle), or other source. Fluorescence emitted by the specimen is collected by infinity-corrected microscope objective 115 (or other high-numerical-aperture objective lens) which is focused on the specimen by piezo positioner 120 (or other focusing mechanism). Emission filter 320 is chosen to reject light at the illumination wavelength and to pass the emission band of the fluorophore in use. The microscope objective 115 and tube lens 125 form a real image of the specimen on two-dimensional detector array 330. An image of the specimen is collected by moving the microscope slide at constant speed using motorized stage 105 in a direction perpendicular to an edge dimension of detector array 330, combining a sequence of equally-spaced overlapping two-dimensional images from the array (usually spaced one line apart) to construct a time-integrated image of one strip of the specimen. Data from detector array 330 is read out by frame grabber 340 and passed to computer 350 where sequential overlapping area images are added together on a line-by-line basis to form adjacent strip images that are then assembled to form a complete image of the specimen. The detector array of FIG. 3 is referred to as being a two dimensional (or "area") array because a signal from the entire detector array (or from a two-dimensional area of the array) is sent to the processor whenever a signal is sent. Preferably, the scanning stage 105 moves and a microscope optical train 360, which includes the two-dimensional detector array 330 does not move laterally. Alternatively, the stage 105 can be mounted in a fixed position and the optical train 360 can be moved laterally in a direction opposite to the direction that the slide 101 normally moves.

When used for brightfield imaging, transmitted-light illumination source 305 is used instead of illumination source 310 (which illuminates the specimen from above) and emission filter 320 is removed from the optical train 360.

In all of these prior art scanners, magnification can be changed by changing microscope objectives (for example using a turret), but this requires a focus change before scanning with a higher-magnification objective, and registration differences between images from different objectives makes it difficult to use a low magnification image as an index image. Some prior-art scanners insert a magnifying lens in front of the detector to achieve higher resolution, which also requires focus adjustments before scanning.

For infinity-corrected microscopes, the space between microscope objective 115 and tube lens 125 is called the infinity space. After passing through the infinity-corrected objective, light from each point in the object results in a bundle of parallel light rays in the infinity space travelling towards the tube lens. The tube lens forms a real image of the object on the detector array. Optical accessories like filters or beamsplitters can be placed in the infinity space without affecting the final image. In the Nikon CFI60 microscope system, the standard tube lens has 200 mm focal length, and is placed 100-200 mm from the microscope objective (creating an infinity space 100-200 mm in length). Because low power objectives create parallel bundles of light rays in the infinity space that may have larger angles with the optic axis of the microscope than those from high power objectives, placing the tube lens closer to the microscope objective allows it to capture more of the large-angle rays, reducing vignetting in the final image (especially for low magnification images).

Definitions

For the purposes of this patent document, a "macroscopic specimen" (or "large microscope specimen") is defined as one that is larger than the field of view of a compound optical microscope containing a microscope objective that has the same Numerical Aperture (NA) as that of the scanner described in this document.

For the purposes of this patent document, "fluorescence" includes but is not limited to single-photon excitation, two-photon and multiphoton fluorescence, spectrally-resolved fluorescence, and photoluminescence; and "specimen" includes but is not limited to tissue specimens, genetic microarrays, protein arrays, tissue arrays, cells and cell populations, biochips, arrays of biomolecules, plant and animal material, insects and semiconductor materials and devices. Specimens may be mounted on or contained in any kind of specimen holder. "Fluorophores" include synthetic fluorophores, fluorescent proteins, and quantum dots. "Autofluorescence" is fluorescence from endogenous molecules, like proteins in a tissue specimen.

For the purposes of this patent document, "exposure" means any combination of illumination intensity, scan speed (which when increased reduces dwell time for spot-scanning systems) or shutter speed (for linear detector arrays, e.g. CCD arrays or CMOS arrays; or for area arrays, e.g. CCD, CMOS or sCMOS arrays) and/or detector gain (which can be adjusted by changing PMT voltage and/or preamplifier gain in a spot-scanning instrument, or signal gain in an instrument using array detectors).

For the purposes of this patent document, TDI or Time Delay and Integration is defined as the method and detectors used for scanning moving objects (usually consisting of a CCD-based detector array) in which charge is transferred from one row of pixels in the detector array to the next in synchronism with the motion of the real image of the moving object. As the object moves, charge builds up and the result is charge integration just as if a longer exposure was used in a stationary imaging situation. When the image (and integrated charge) reaches the last row of the array, that line of pixels is read out. In operation this last line of the moving image is read out continuously as the specimen moves relative to the detector. One example of such a camera is the DALSA Piranha TDI camera.

For the purposes of this patent document, MSIA or Moving Specimen Image Averaging is defined as a method used for scanning moving objects using an area detector array (usually sCMOS, CMOS or CCD) in which data from several (or all) rows in the detector array are transferred to a processor in synchronism with the motion of the real image of the moving object across the array as the specimen moves in a direction perpendicular to the optical axis of the instrument and perpendicular to an edge dimension of the detector array. A sequence of equally-spaced overlapping two-dimensional images from the array (usually spaced one line apart) are averaged together to construct a time-integrated image of one strip of the specimen. For example, if the array contains N=256 rows of pixels, and data are transferred each time the image has moved the distance between adjacent rows of pixels, then each pixel in the final image will be exposed 256 times, resulting in a signal/noise increase of $N^{1/2}=16$.

For the purposes of this patent document the term "image acquisition" includes all of the steps necessary to acquire and produce the final image of the specimen, including some of but not limited to the following: the steps of preview scanning, instrument focus, predicting and setting gain for imaging each fluorophore, image adjustments including scan linearity adjustment, field flattening (compensating for fluorescence intensity variation caused by excitation intensity and detection sensitivity changes across the field of view), correction of fluorescence signal in one channel caused by overlap of fluorescence from adjacent (in wavelength) channels when two or more fluorophores are excited simultaneously, dynamic range adjustment, butting or stitching together adjacent image strips (when necessary), storing, transmitting and viewing the final image.

For the purposes of this patent document, the term "image processing" means all of the steps required to process the data to prepare the final image file, including some of but not limited to the following: the steps of scan linearity adjustment, field flattening, correction for crosstalk when simultaneously scanning multiple fluorophores, correcting fluorescence image data by subtracting fluorescence originating from the glass of the microscope slide, subtracting the dark-current noise floor from the detector, and contracting the dynamic range of the image data to match the (smaller) dynamic range of the final image.

For the purposes of this patent document, a "frame grabber" is any electronic device that captures individual, digital still frames from an analog video signal or a digital video stream or digital camera. It is often employed as a component of a computer vision system, in which video frames are captured in digital form and then displayed, stored or transmitted in raw or compressed digital form. This definition includes direct camera connections via USB, Ethernet, IEEE 1394 ("FireWire") and other interfaces that are now practical.

For the purposes of this patent document, a "scan lens" is a flat-field, colour-corrected and infinity-corrected objective lens with an external exit pupil. When used as a focusing lens in a beam scanner, a parallel beam of light enters from the side of the scan lens away from the object through the same pupil, which is now an entrance pupil, and a scanning mirror can be placed at the external entrance pupil position without requiring any intermediate optics between the mirror scanner and the scan lens. A "laser scan lens" is a scan lens designed for use with laser light sources, and is usually not colour-corrected. When used for scanning an incoming parallel beam of light, the entrance pupil is at the position of the mirror scanner, however when used as an imaging objective, this becomes the exit pupil of the lens. Scan lenses are often telecentric, or nearly telecentric. This definition includes infinity-corrected telecentric objectives that were not designed specifically for beam scanning.

OBJECTS OF THE INVENTION

1. It is an object of this invention to provide an instrument and method for scanning large microscope specimens where the magnification of the instrument can be adjusted over a continuous range to enable scans of the specimen at a range of resolutions without changing the microscope objective.

2. It is an object of this invention to provide an instrument and method for scanning large microscope specimens where the magnification of the instrument can be changed in a series of steps to enable scans of the specimen at multiple resolutions using the same microscope objective.

3. It is an object of this invention to provide an instrument and method for scanning large microscope specimens in which a rapid, low resolution scan can be used to provide an index image for finding areas of interest, and the magnification can be increased to allow the scanner to acquire a high-resolution image of the areas of interest without changing microscope objectives.

4. It is an object of this invention to provide an instrument and method for scanning large microscope specimens in which a rapid, low-resolution scan can be used to provide an index image for finding areas of interest, and the magnification can be adjusted to allow the scanner to acquire an image of this area of interest with a higher resolution but where the width of the scan strips can be adjusted to reduce the number of strips required to image the entire area of interest while maintaining an appropriately higher magnification.

5. It is an object of this invention to provide an instrument and method for scanning large microscope specimens in which a rapid, low-resolution scan can be used to provide an index image for finding areas of interest, and the instrument is then used to take one or more single field-of-view images at one or more areas of interest in the index image where such single field-of-view images are acquired when there is no relative motion between the specimen and the detector array, and where magnification can be adjusted such that the area of interest fills the field-of-view of the instrument.

6. It is an object of this invention to provide an instrument and method for scanning a large microscope specimen or specimens in fluorescence in which a rapid, low-resolution scan can be used to provide an index image for finding areas of interest, and to predict the fluorescence exposure required for higher-resolution scans or single field-of-view images.

7. It is an object of this invention to provide an instrument and method for scanning large microscope specimens in which a rapid, low-resolution scan can be used to provide an index image for finding areas of interest, and higher resolution images of these areas of interest can be acquired using single field-of-view images where the single field of view is large enough to include the entire area of interest while still having the required magnification, or using tiling of several single-field-of-view images to include the entire area of interest in a single tiled image.

8. It is an object of this invention to provide an instrument and method for scanning large microscope specimens in which a rapid, low-resolution scan can be used to provide an index image for finding areas of interest, and higher resolution images of these areas of interest can be acquired using single field-of-view images where the single field of view is large enough to include the entire area of interest while still having the required magnification, where a series of single field-of-view images of the same field-of-view can be used to monitor changes in the specimen as a function of time.

9. It is an object of this invention to provide an instrument and method for scanning large microscope specimens in which a rapid, low-resolution scan can be used to provide an index image for finding areas of interest, and higher resolution images of these areas of interest can be acquired by tiling of several single-field-of-view images to include the entire area of interest in a single tiled image, and a series of such tiled images of the area of interest can be used to monitor changes in the specimen as a function of time.

10. It is an object of this invention to provide a zoom microscope slide scanner using a parfocal zoom lens where the instrument can be focused at the highest magnification (the longest focal length of the zoom lens) and focus is maintained when zooming to smaller magnification.

DESCRIPTION OF THE INVENTION

The magnification marked on the barrel of an infinity-corrected microscope objective is equal to the focal length of the tube lens divided by the focal length of the objective. In the Nikon CFI60 system, the tube lens has a focal length of 200 mm. The CFI Plan Apochromat 20× has a focal length of 10 mm and an NA of 0.75. If a detector array with 10 micron pixels is used, this will result in an image in which each pixel represents 0.5 microns on the specimen, which requires an optical resolution of 1 micron or better, using a simple interpretation of the Nyquist theorem. According to Nikon, the optical resolution of a 0.75 NA Plan Apochromat is approximately 0.37 microns when used with white light illumination, so this objective (which is labelled a 20× objective) has an NA that is large enough for it to be used for 40× digital imaging if the tube lens focal length is increased to 400 mm.

A PCO.Edge detector (which has 6.5 micron pixels) was chosen for MSIA imaging or a linear array with 6 micron pixels for line scanning. Using the PCO.Edge with 6.5 micron detector pixels, the same 20× image magnification as achieved with an array using 10 micron detector pixels can be achieved using a tube lens with a focal length of (6.5/10)*200=130 mm. In this example, a 260 mm focal length tube lens results in 40× magnification, and a 65 mm tube lens results in 10× magnification. Using the same representation for the size of one pixel on the specimen (1 micron pixels for 10×, 0.5 micron for 20×, and 0.25 micron for 40×), a microscope-slide scanner with variable magnification can be constructed using a single microscope objective (in the example above, a Nikon 0.75 NA Plan Apochromat CFI60 microscope objective is used) and using a zoom lens as a tube lens, which allows the focal length of the tube lens to be varied over a wide range.

Figure 4:
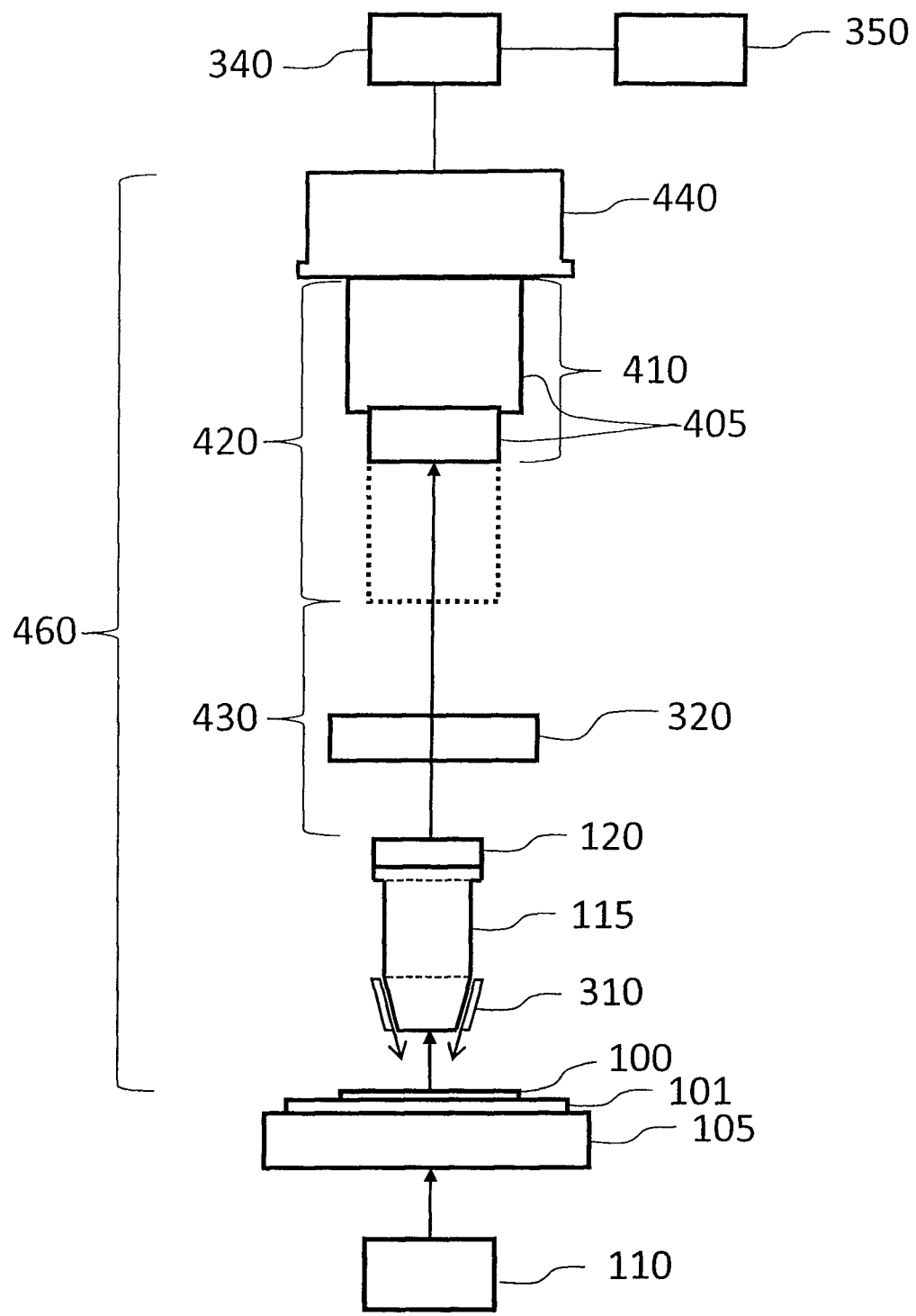
FIG. 4 is a schematic view of a microscope slide scanner in which a zoom lens is used as a tube lens.

FIG. 4 shows a schematic view of a microscope slide scanner with continuously variable magnification for brightfield and fluorescence imaging that is a first embodiment of this invention. A tissue specimen 100 (or other specimen to be imaged) is mounted on microscope slide 101 on a scanning stage 105 that moves the specimen at constant velocity in a direction perpendicular to an optical train 460 of the instrument and perpendicular to an edge dimension of detector array 440.

For brightfield imaging, light from illuminator 110 illuminates the specimen 100 from below and light passing through the specimen is collected by infinity-corrected microscope objective 115 (or other high-numerical-aperture infinity-corrected objective lens) which is focused on the specimen by piezo positioner 120 (or other focusing mechanism, one example of which is to move the specimen in the vertical direction to achieve focus while the objective lens remains stationary). Moving the specimen in the focus direction using a moving stage is an optional focusing method. Emission filter 320 is removed from the optical train 460 during brightfield imaging. The microscope objective 115 and a zoom tube lens 405 form a real image of the specimen on detector array 440. Detector array 440 is one of a linear array, TDI linear array, or 2D MSIA detector array. The physical length of zoom tube lens 405 changes from length 410 to length 420 when the focal length is increased, causing the inner barrel of the lens to extend (as shown with dotted lines). Zoom lens 405 is placed a distance 430 above microscope objective 115, where the distance 430 is large enough to leave room for optical accessories to be placed in the infinity space between microscope objective 115 and zoom tube lens 405 even when the zoom tube lens is zoomed to its longest focal length. For example, when Nikon CFI60 objectives are used, distance 430 is usually set to 100 mm.

Figure 1:
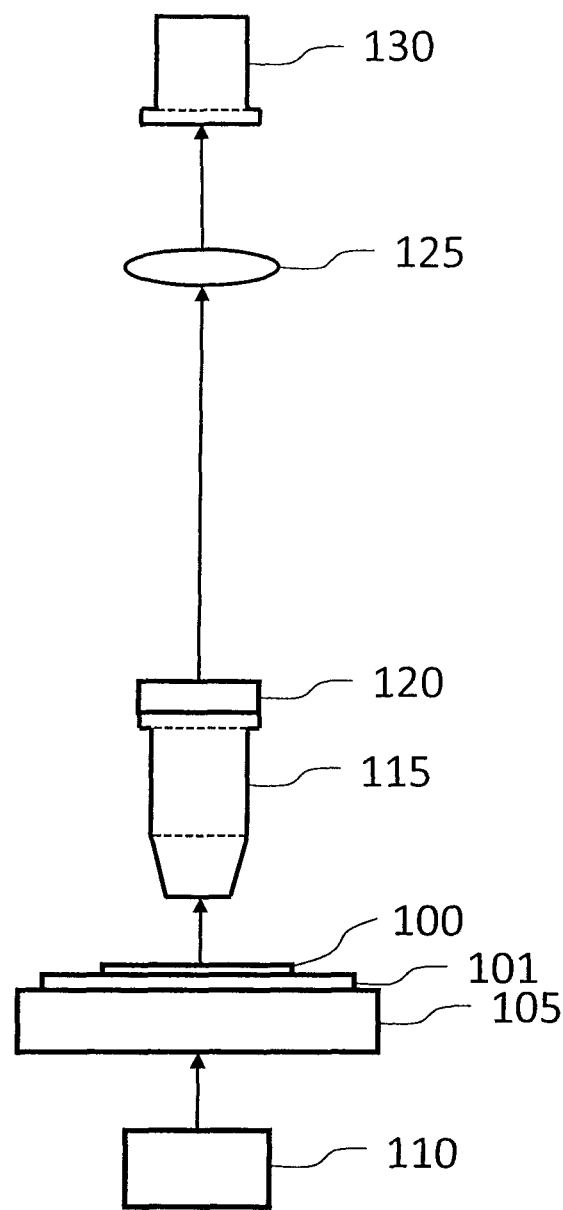
FIG. 1 is a schematic view of a prior art brightfield microscope slide scanner using a linear or TDI detector array.
Figure 2:
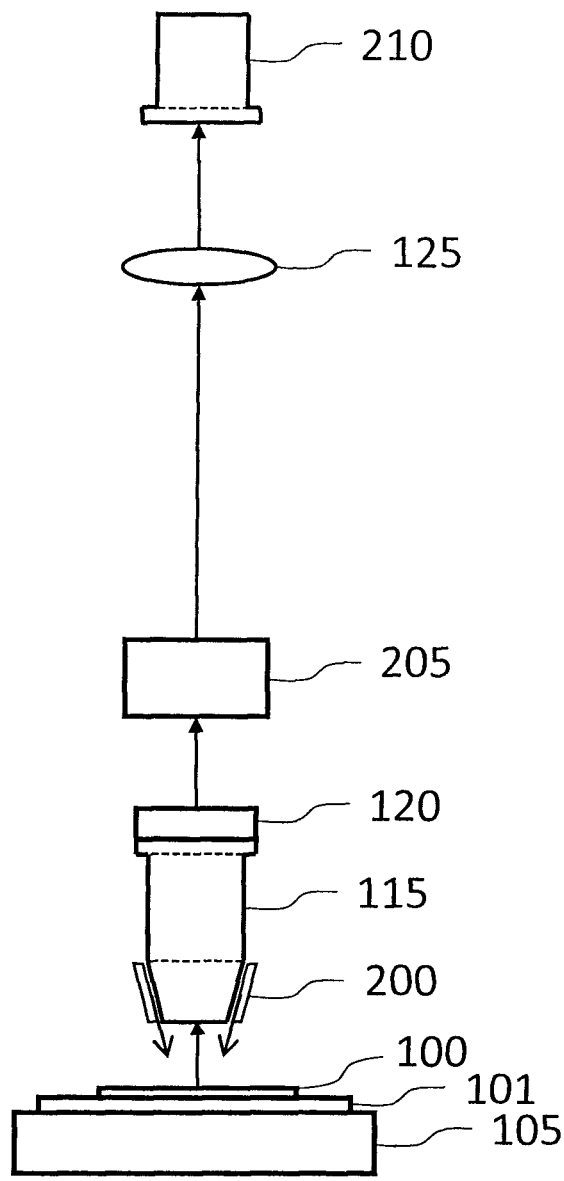
FIG. 2 is a schematic view of a prior art fluorescence microscope slide scanner using a linear or TDI detector array.
Figure 3:
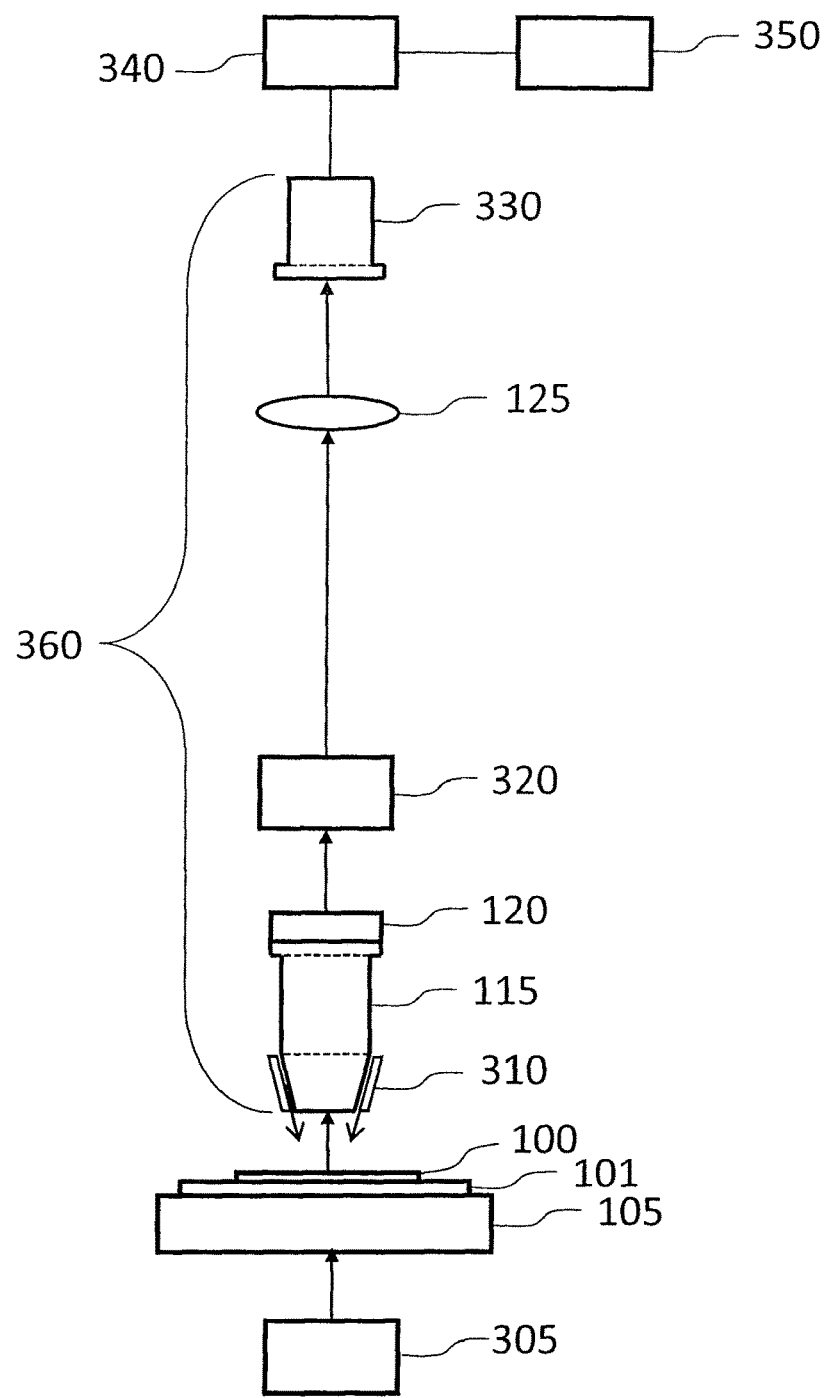
FIG. 3 is a schematic view of a prior art microscope slide scanner for fluorescence and brightfield imaging using an area detector array for MSIA imaging.

An image of the specimen is collected by moving the microscope slide at constant speed using motorized stage 105 in a direction perpendicular to an edge dimension of detector array 440, combining a sequence of equally-spaced line images from the array to construct an image of one strip of the specimen. {The method of data collection and processing for MSIA imaging is different from imaging using a linear array or TDI linear array detector, and was described earlier in this document in the description of FIG. 3. The detector array 330 of FIG. 3 is referred to as being a two dimensional (or "area") array because a signal from the entire detector array (or from a two-dimensional area of the array) is sent to the processor whenever a signal is sent.} Data from detector array 440 is read out by frame grabber 340 and passed to computer 350 where strips are then assembled to form a complete image of the specimen.

Preferably, the scanning stage 105 moves and a microscope optical train 460, which includes detector array 440 does not move laterally. Alternatively, the stage 105 can be mounted in a fixed position and the optical train 460 can be moved laterally in a direction opposite to the direction that the slide 101 normally moves.

In operation, a low resolution scan is usually performed first, with the focal length of the zoom tube lens set to a short focal length (70 mm in one prototype). When imaging at 10×, the specimen is moved twice as fast as at 20×, and the strip width is twice that at 20×, so the scan time is ¼ of that required for a full-specimen scan at 20×. When compared to a full-specimen scan at 40×, the scan time at 10× is ¹⁄₁₆ of the time required for a complete 40× scan. After scanning the entire specimen at low resolution, the resulting image can be used as an index scan to find areas of interest that can then be scanned at higher resolution by increasing the focal length of the zoom tube lens, or additionally when an area detector is used for MSIA scanning, the specimen can be moved to an area of interest where the area detector can be used for acquiring images of a stationary specimen as a function of time, or for imaging an area of the specimen that is larger than the field of view using tiling.

For fluorescence imaging, transmission illuminator 110 is turned off, and the tissue specimen is illuminated from above by illumination source 310, mounted above the specimen (epifluorescence) so that the intense illumination light that passes through the specimen is not mixed with the weaker fluorescence emission from the specimen, as it would be if the fluorescence illumination source were below the specimen. Several different optical combinations can be used for epifluorescence illumination—light from a source mounted on the microscope objective, as shown; illumination light that is injected into the microscope tube between the microscope objective and the tube lens using a dichroic beamsplitter to reflect it down through the microscope objective and onto the specimen; and several others. A narrow wavelength band for the illumination light is chosen to match the absorption peak of the fluorophore in use. This narrow-band illumination may come from a filtered white-light source, an LED or laser-based source (including a laser sent through a diffuser plate in rapid motion to eliminate speckle), or other source. Fluorescence emitted by the specimen is collected by infinity-corrected microscope objective 115 (or other high-numerical-aperture objective lens) which is focused on the specimen by piezo positioner 120 (or other focusing mechanism). Emission filter 320 is chosen to reject light at the illumination wavelength and to pass the emission band of the fluorophore in use, and is placed in the infinity space within the distance 430 above microscope objective 115. The microscope objective 115 and zoom tube lens 405 form a real image of the specimen on two-dimensional detector array 330. An image of the specimen is collected by moving the microscope slide at constant speed using motorized stage 105 in a direction perpendicular to an edge dimension of detector array 440 (where for fluorescence imaging, detector array 440 is one of a linear TDI array or an MSIA area array), combining a sequence of equally-spaced line or overlapping area images from the array (usually spaced one line apart) to construct an image of one strip of the specimen. Data from detector array 440 is read out by frame grabber 340 and passed to computer 350 where strips are then assembled to form a complete image of the specimen. MSIA imaging is often used for fluorescence scanning. {The method of data collection and processing for MSIA imaging is different from imaging using a linear array or TDI linear array detector, and was described earlier in this document in the description of FIG. 3. The detector array 330 of FIG. 3 is referred to as being a two dimensional (or "area") array because a signal from the entire detector array (or from a two-dimensional area of the array) is sent to the processor whenever a signal is sent.}

In fluorescence operation, detector array 440 is a TDI linear array or a 2D MSIA detector array. A low resolution scan is usually performed first, with the focal length of the zoom tube lens set to a short focal length. After scanning the entire specimen at low resolution, the resulting image can be used as an index scan that can be used to predict fluorescence exposure for high-resolution scans, and to find areas of interest that can then be scanned at higher resolution by increasing the focal length of the zoom tube lens. For MSIA scanning, where an area detector is used, the specimen can be moved to an area of interest where the area detector exposure time can be increased for imaging weak fluorophores in a stationary specimen, sequential images can be used to monitor changes in fluorescence as a function of time, and an area of the specimen that is larger than the field of view can be acquired using tiling.

Figure 5:
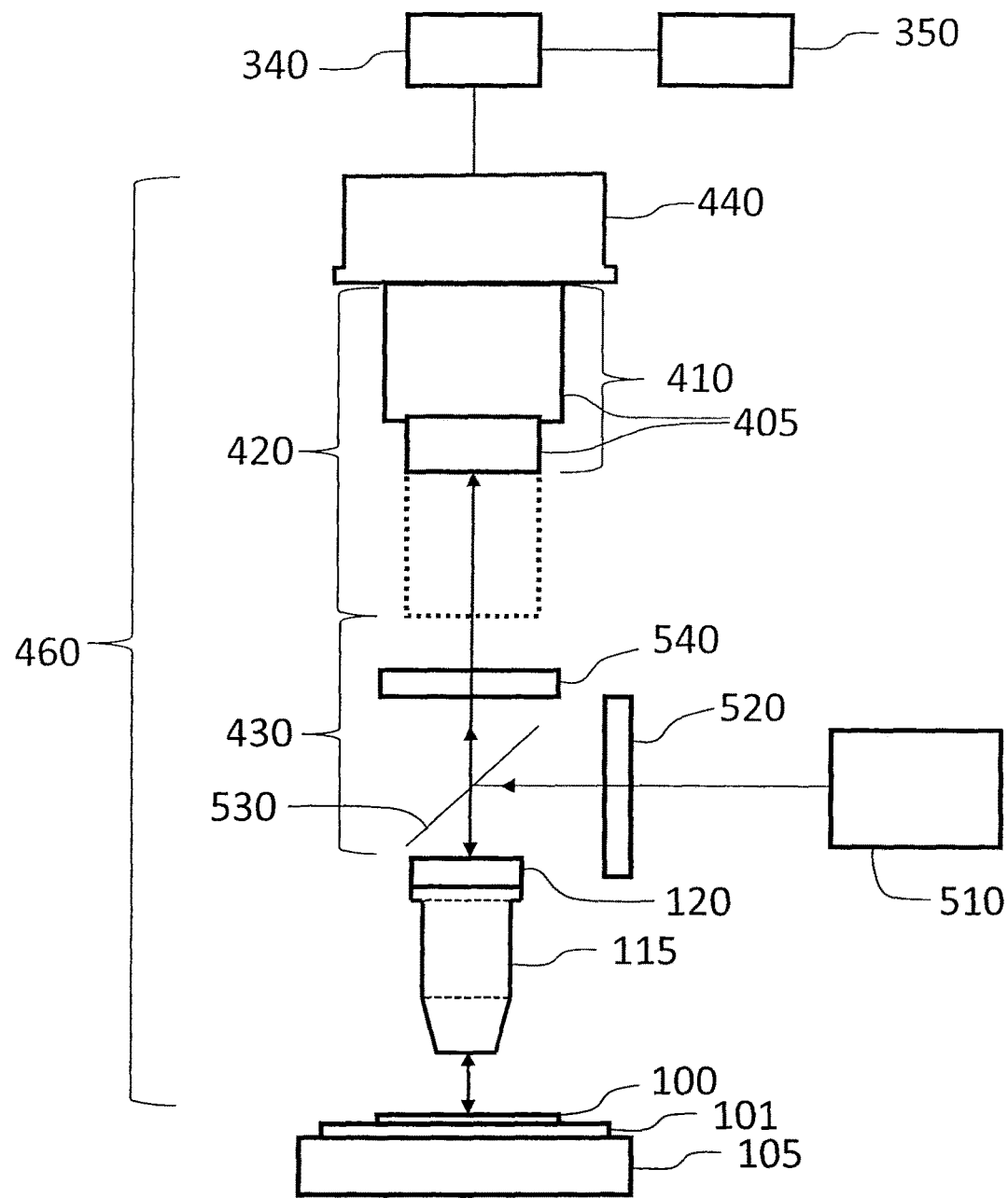
FIG. 5 is a schematic view of a fluorescence microscope slide scanner using a zoom lens as a tube lens, and in which epi-illumination is injected into the infinity space, which also contains an emission filter.

FIG. 5 is a schematic view of a fluorescence microscope slide scanner with continuously variable magnification that is a second embodiment of this invention. In this fluorescence microscope slide scanner epi-illumination is provided by light source 510 and excitation filter 520 (chosen to provide a narrow band of illumination to match the excitation peak of the fluorophore in use). After passing through excitation filter 520, light is injected into the infinity space 430 above infinity-corrected microscope objective 115 (or other high-numerical-aperture infinity-corrected objective lens), is reflected towards microscope objective 115 by dichroic beamsplitter 530 (chosen to reflect wavelengths in the excitation band of the fluorophore in use), and passes through microscope objective 115 to illuminate an area on specimen 100. Fluorescence from the illuminated area is collected by microscope objective 115, resulting in parallel bundles of rays in the infinity space 430 from each fluorescing point in the specimen. This fluorescence emission passes through the dichroic beamsplitter 530 and through emission filter 540. Emission filter 540 is chosen to pass wavelengths in the emission spectrum of the fluorophore in use, and to reject other wavelengths. The parallel bundles of fluorescence light from the specimen are focused by zoom tube lens 405 onto detector array 440, forming a real image of the fluorescent specimen. As described in FIG. 4, when used for fluorescence imaging, detector array 440 is one of a linear TDI array or an MSIA area array.

Figure 6:
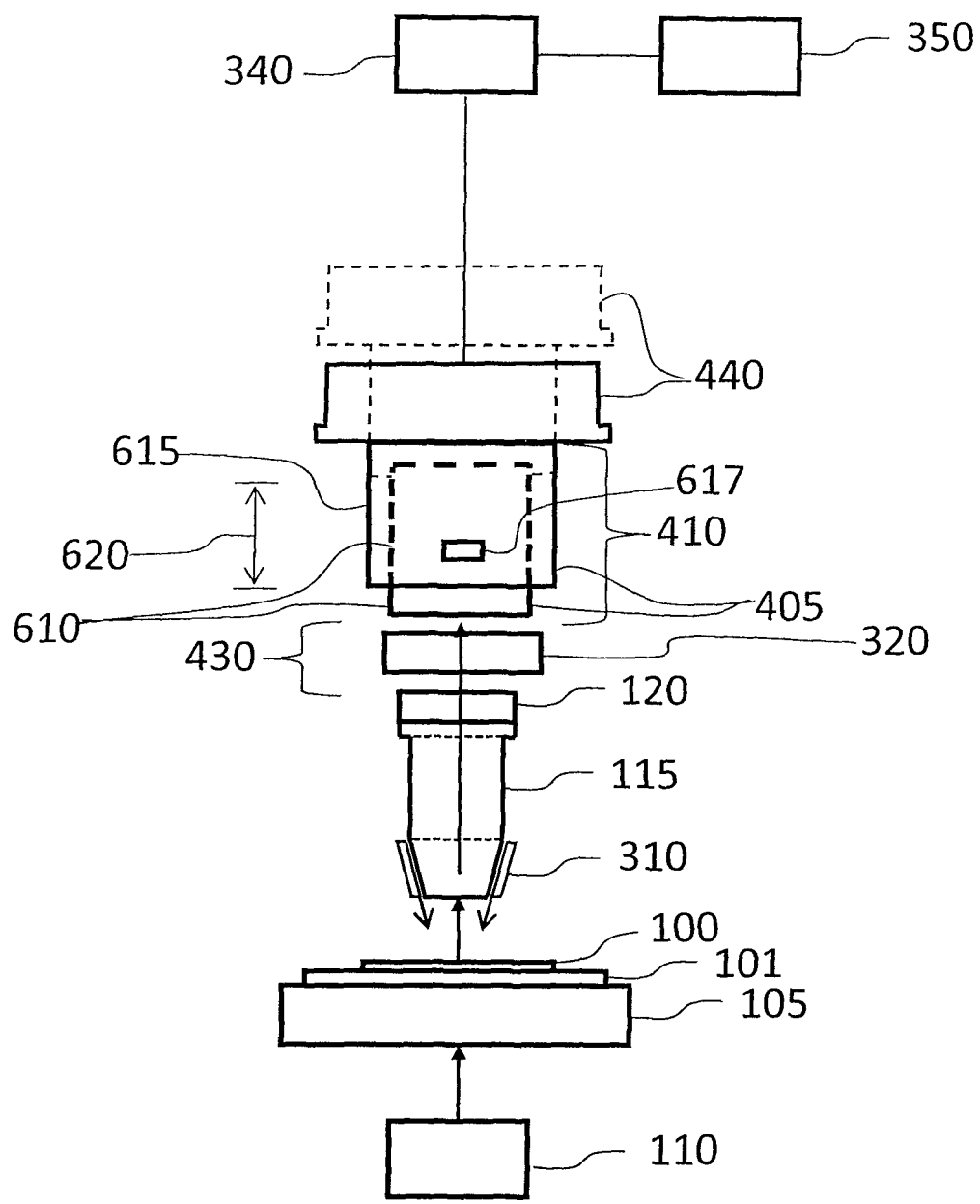
FIG. 6 is a schematic view of a microscope slide scanner in which the length of the infinity space stays constant as the focal length of the tube lens is changed.

FIG. 6 shows a schematic view of a microscope slide scanner with continuously variable magnification for brightfield and fluorescence imaging that is a third embodiment (and a preferred embodiment) of this invention. The instrument described in FIG. 6 is similar to that shown in FIG. 4, except that in this case the zoom tube lens 405 is comprised of a stationary barrel 610 which is held stationary at the top of infinity space 430, and an outer moving barrel 615 and detector 440 move up and down as the focal length of zoom tube lens 405 is changed. When the focal length of zoom lens 405 is changed from a minimum to a maximum, the outer zoom lens barrel 615 and detector array 440 move upward a distance 620. In addition, in this embodiment the length of infinity space 430 has been reduced, leaving only enough infinity space for fluorescence emission filter 320. In this embodiment the length of infinity space 430 remains constant when the focal length of zoom tube lens 405 is changed, and in addition the length of infinity space 430 has been reduced. When low magnification is chosen, an increased field of view of microscope objective 115 is necessary, and parallel bundles of rays from object points near the edge of the field of view make larger angles with the optic axis than when larger magnification is used. This embodiment maximizes the capture of large-angle bundles of rays by zoom tube lens 405. If these large-angle rays are not captured by zoom lens 405, the image acquired by detector 440 will show vignetting, which will be most apparent at low magnification. A window 617 in the outer barrel of zoom lens 405 allows the operator to read the focal length to which the lens has been zoomed. The optical magnification of the scanner is equal to the focal length of zoom lens 405 (read through window 617) divided by the focal length of infinity-corrected microscope objective 115.

The instrument described in FIG. 6 is used for brightfield imaging when emission filter 320 is removed, and transmission light source 110 is used for illumination of specimen 100 from below. For fluorescence imaging, light source 110 is turned off and epi-fluorescence light source 310 is used, tuned to a wavelength band that is appropriate for the fluorophore in use. At the same time, emission filter 320 (chosen to match the peak wavelength band of the fluorescence emission spectrum) is inserted into the optical train.

If fluorescence imaging using epi-illumination injected into the microscope tube (as in FIG. 5) is implemented, the length of infinity space 430 must be increased to allow both dichroic mirror 530 and emission filter 540 to be inserted into the infinity space between microscope objective 115 and the bottom of the inner tube 610 of zoom tube lens 405.

When detector array 440 is one of a linear array, linear TDI array or 2D MSIA detector array, a rapid low-magnification (low-resolution) scan can be used to acquire an index image for finding and specifying the position of areas of interest in the specimen, and for predicting the exposure required for high-resolution fluorescence images. When a high-resolution image of the area of interest is required, it can be achieved by scanning after increasing the focal length of zoom lens 405 to increase magnification of the scanner. Magnification can be changed by simply changing the focal length of the zoom lens, without changing microscope objectives. Magnification can be adjusted to allow the scanner to acquire an image of this area of interest at a higher resolution where the width of the scan strips can be adjusted by changing the focal length of the zoom lens to minimize the number of strips required to image the entire area of interest while maintaining an appropriately higher magnification.

If detector array 440 is an area detector for MSIA scanning, 2-D area images of the area of interest can be acquired when the specimen is stationary. A rapid, low-magnification scan can be used to provide an index image for finding areas of interest, and the instrument can then be used to take one or more single-field-of-view images at one or more positions of interest in the index image where such single-field-of-view images are acquired when there is no relative motion between the specimen and the detector array, and where magnification can be adjusted such that the area of interest fills the field-of-view of the instrument. In addition, fluorescence contrast from the area of interest in a rapid low-resolution fluorescence scan can be used to predict the appropriate exposure for single field-of-view fluorescence images. When the area of interest is larger than the field of view of the microscope at the required magnification, tiling of several single-field-of-view images can be used to form a high-resolution image of the entire field of interest. When one single-field-of-view image contains the entire area of interest, a series of exposures can be used to monitor changes in the specimen as a function of time. If the area of interest is too large to be contained in a single-field-of-view image, then a series (in time) of tiled images of the area of interest can be used to monitor changes in the specimen as a function of time.

If zoom lens 405 is a parfocal zoom lens, in which no change in focus occurs when the lens is zoomed, the microscope can be focused at highest magnification (when the zoom lens is at maximum focal length, and where focus is most critical) and focus will be maintained when zoom lens 405 is zoomed to shorter focal lengths for lower magnification.

Although infinity-corrected microscope objectives are usually used, scan lenses and telecentric lenses that are infinity-corrected can also be used instead of microscope objectives. In these cases, the scan or infinity-corrected telecentric lens should be mounted such that its exit pupil is close to the entrance pupil of the zoom lens (when the zoom lens is adjusted to its shortest focal length). This will maximize the acceptance angle of the zoom lens for off-axis parallel bundles of light rays and minimize vignetting when the magnification of the system is low. Vignetting is not such a problem when the zoom lens is adjusted to longer focal lengths, since even though its entrance pupil moves away from the front of the lens as the focal length increases, the maximum angle between the bundles of parallel rays leaving the objective and the optic axis reduces rapidly as the field of view of the microscope decreases with increasing focal length of the zoom lens.

Each of the variable-magnification microscope slide scanners described above used a zoom lens focused on one detector array, and in the scanner using MSIA detection, the same detector was used for both scanning and area imaging of stationary specimens. It is possible to design a variable-magnification microscope slide scanner that can be used for both scanning and stationary-specimen imaging using a TDI linescan detector by using a zoom lens and two detectors (a TDI detector for scanning and an area detector for stationary imaging) to enable both scanning and area imaging of stationary specimens in the same instrument. For example, a variable-magnification fluorescence scanner can be designed using a zoom lens focused on a TDI linescan detector for scanning, and then on an area detector for single-field-of-view imaging when the specimen is stationary. For brightfield, the zoom lens can be focused on a linescan camera for scanning, or on an area detector for single-field-of-view imaging when the specimen is stationary. In both of these cases (brightfield and fluorescence) the single-field-of-view images can be used for monitoring changes in the specimen as a function of time, and/or used for tiling.

When the magnification is changed in a scanner the scan speed (speed of the scanning stage) must be re-synchronized with the exposure frequency (line rate for a linescan camera, frame rate for MSIA, or charge transfer rate for TDI) so that the specimen moves a distance equal to the distance between pixels in the final image each time a new exposure is triggered, by adjusting either the stage scan speed or the exposure frequency.

For a scanner using a linescan detector with a single row of detector pixels, after a magnification change by zooming the new stage scan speed or exposure frequency can be estimated since even if the values are 1% away from the correct values, the result is only a 1% change in the length of the image strip, which will not be noticeable in a tissue image.

When the magnification is changed in a scanner using MSIA or TDI detection, the scan speed (speed of the scanning stage) and the exposure frequency {frame rate (MSIA) or charge transfer rate (TDI)} must be synchronized before scanning to ensure that the scanning stage moves a distance equal to the distance between pixels in the final image each time a new exposure is triggered. As one example, consider a 100-stage TDI device or an MSIA detector using 100 active lines (for MSIA using the PCO.Edge this is accomplished by choosing a 2560×100 detector region of interest). The detector region of interest is a rectangular sub-array of pixels in the detector. This is different from an area (or region) of interest in the specimen, which is an area of the specimen that has a specific property that is of interest to the pathologist (which in some cases is chosen by image analysis software). For this example, assume the magnification has been changed to achieve 0.5 micron pixels in the final image (often used in digital microscopes to approximate a 20× magnification image). In this example spacing of pixels in the final image is equivalent to a spacing of 0.5 microns on the specimen ("0.5 micron pixels"). If the detector pixel spacing is 6.5 microns, as it is in the PCO.Edge detector, and a microscope objective with a 10 mm focal length is used, then an optical magnification of 6.5/0.5=13 is required, and the zoom tube lens should be adjusted to a focal length of 13×10=130 mm, since the optical magnification of the scanner=$f_{tube\ lens}/f_{objective}$.

Figure 7:
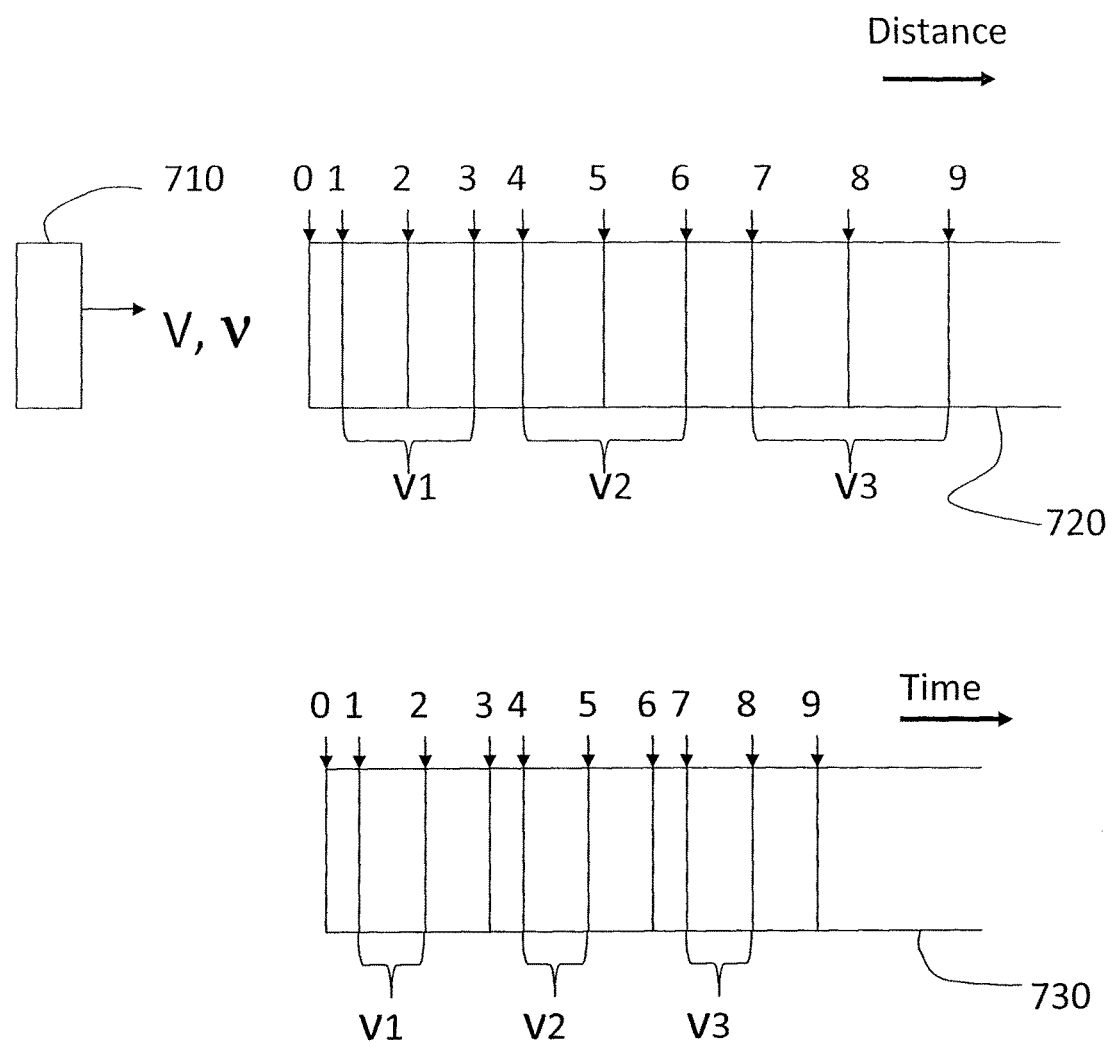
FIG. 7 is a schematic view of the capture of an image strip when the motion of the detector increases in speed along the specimen strip but the exposure frequency remains constant.

Method #1: After adjusting the focal length of the zoom tube lens to change the magnification of the scanner, estimate the scan speed that would be required for that magnification for a constant charge transfer rate (TDI) or frame rate (MSIA). In this example, for easy calculation, assume the charge transfer rate or frame rate is 100/second, and use a 100-line detector as described in the previous paragraph. Using 0.5 micron specimen pixels, the scan speed that synchronizes with this charge transfer rate or frame rate is 50 microns/second. Also assume the magnification calculated using the focal length read through window 617 in zoom tube lens 405 after zooming is within +/−10% of the actual value, resulting in an estimated scan speed of 50 microns/second. Step 1: Acquire a series of images at constant exposure frequency (charge transfer rate or frame rate) while varying the stage scan speed in a series of steps from 10% below the estimated speed to 10% above. FIG. 7 shows the relative motion between a detector 710 and a real optical strip image 720 of a specimen that is being scanned, and a resulting digital strip image 730. For this example, assume detector 710 is an area detector for MSIA imaging. The real optical strip image of the specimen moves from right to left in FIG. 7 across the area detector 710. This is depicted in the figure as relative motion of the detector 710 from left to right across the stationary real image 720. In this example, the relative velocity V of the detector is varied from 45 microns/second to 55 microns/second in 1 micron/second steps, and the exposure rate ν remains constant at 100 frames/second. When detector 710 reaches starting point 0, the exposure clock is started at a constant frequency ν, and the speed of the detector is increased to increase the relative velocity to a value V1=45 microns/second before the leading edge of the detector reaches point 1 (after ½ second of travel), and this speed is maintained until the leading edge of the detector reaches point 3. When the leading edge of the detector reaches point 3, 100 lines of constant-speed image data will have been acquired and stored between points 1 and 2 in strip image 730. Between points 3 and 4 the relative speed of detector 710 is increased to 46 microns/second, and when the leading edge of the detector reaches point 6, 100 lines of constant-speed data will have been acquired between points 4 and 5 in Image 730. Between points 6 and 7, the relative speed of detector 710 is increased to 47 microns/second, and when the leading edge of detector 710 reaches point 9, 100 lines of constant-speed data will have been acquired between points 7 and 8 in strip image 730. This sequence is continued until data has been acquired with V11=55 microns/second. Eleven constant-speed images, each 100 pixels long, will now be contained in Image Strip 730 which is comprised of 2750 lines of data. The first constant-speed image is 100 pixels wide, starting at pixel position 50; constant-speed image #2 starts at pixel position 300, after allowing ½ second for the stage scan speed to increase to a new constant speed, followed by 100-pixel-wide constant-speed images that start every 250 pixels along the strip. The parts of image strip 730 between points 0 and 1, 2 and 4, 5 and 7, and so on, contain data that has been blurred by changing relative detector velocity during acquisition and should be ignored. The constant-speed image with the highest spatial frequencies will be the image in which the relative speed of the detector is best synchronized with the constant exposure frequency at that magnification. In this example, the best image may have been acquired with a scan speed that is up to ½% different from the best scan speed, which means the pixel data acquired by the leading edge of the detector can be displaced by half a pixel distance when compared to the pixels acquired by the trailing edge of the detector, which may result in slight blurring of all pixels in the image if that scan speed is used. A second, iterative calculation of scan speed can then be accomplished by repeating the measurement, starting 1% below and ending 1% above the scan speed of the best constant-speed image, and acquiring a sequence of images in 0.1% steps to calculate a better value for scan speed. This final value will be within 0.05% of the correct value for this magnification, which will cause pixel negligible pixel blurring in the final scan image since data averaged to produce the final image will be from measurements that are all within a distance equal to 1/20 of the distance between pixels. In a scanner that is computer controlled, these steps can be automated and a value for scan speed can be quickly calculated automatically whenever the magnification of the instrument is changed.

Figure 8:
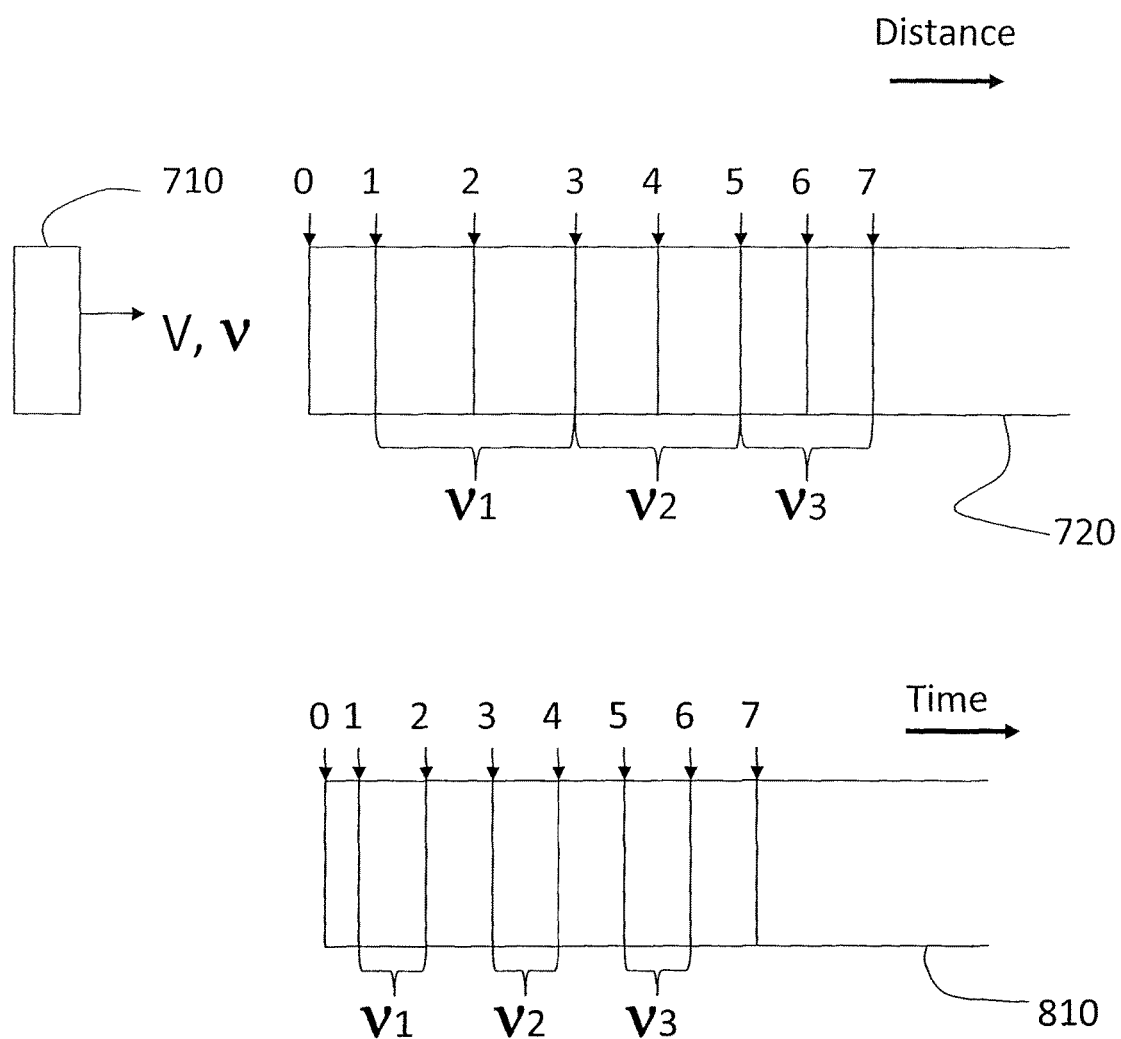
FIG. 8 is a schematic view of the capture of an image strip when the speed of motion of the detector is held constant but the exposure frequency increases.

Method #2: Instead of varying the speed of the scanning stage and keeping the exposure frequency constant, vary the exposure frequency and keep the speed of the scanning stage constant. FIG. 8 illustrates this situation. In FIG. 8, area detector 710 moves with constant relative velocity along the length of specimen strip 720. Data taking begins at point 0 with exposure frequency set to ν1 (which is lower than the exposure frequency estimated for the new magnification) and constant stage scan speed V. In this example, the exposure frequency will be varied from 90 to 110 frames/second in 1 frame/second steps while the detector relative velocity is kept constant. When detector 710 reaches starting point 0, the exposure clock is started at a frequency ν1, and the speed of the detector is increased between points 0 and 1 to a constant relative velocity of V=50 microns/second before the leading edge of the detector reaches point 1. Fifty exposures are acquired between points 0 and 1 to give the scanning stage time to reach constant velocity. Exposure clock frequency ν1 is maintained until the leading edge of the detector reaches point 3. When the leading edge of the detector reaches point 3, 100 lines of constant-frequency image data will have been acquired and stored between points 1 and 2 in strip image 810. At point 3 the exposure frequency of detector 710 is increased to 91 frames/second, and when the leading edge of the detector reaches point 5, 100 lines of constant-exposure-frequency data will have been acquired between points 3 and 4 in Image 810. At point 5, the exposure frequency of detector 710 is increased to 92 frames/second, and when the leading edge of detector 710 reaches point 7, 100 lines of constant-exposure-frequency data will have been acquired between points 5 and 6 in strip image 810. This sequence is continued until data has been acquired with ν21=110 frames/second. Twenty-one constant-exposure-frequency images will now be contained in Image Strip 810 which is comprised of 4250 lines of data. The first constant-exposure-frequency image is 100 pixels wide, starting at pixel position 50 (position 1 in image 810), constant-exposure-frequency image #2 starts at pixel position 250 (position 3 in image 810), followed by 100-pixel-wide constant-exposure-frequency images that start every 200 pixels along the strip. The part of image strip 810 between points 0 and 1 contains image data that has been blurred by a changing value of stage scan speed, and the parts of image strip 810 between points 2 and 3, 4 and 5, 6 and 7, and so on, contain image data that has been blurred by changing frame rate during acquisition and should be ignored. The constant-exposure-frequency image with the best image sharpness (highest spatial frequency content) will be the image in which the relative speed of the detector is best synchronized with the exposure frequency at that magnification. As before, this sequence can be repeated using a smaller step size above and below the measured best frame rate to achieve even better synchronization between stage scan speed and frame rate.

Method #3: Vary the speed of the stage at a constant rate while holding the exposure frequency constant, or vary the exposure frequency at a constant rate while holding the stage scan speed constant. When a 1 cm strip on a specimen is scanned with 0.5 micron resolution, the strip image will be 20,000 pixels long (and 2500 pixels wide when using a 100×2500 pixel area detector). When the synchronization is changed by +/−10% during this 1 cm scan, the change in synchronization (either by varying stage scan speed or exposure frequency) along a 100-pixel length of the strip image is 1%. Image sharpness will peak at one position along the strip image, yielding a first approximation of the best combination of stage scan speed and exposure frequency. Sharpness of the strip image as a function of position can be measured by segmenting the strip into a series of sub-images along the length of the strip and evaluating spatial frequencies in each sub-image, with the highest spatial frequencies in the sub-image that has the best synchronization between stage scan speed and frame rate (or charge transfer rate in the case of a TDI detector). This measurement can be accomplished in several ways, for example using a tissue specimen imaged in brightfield, or imaging a slide containing a Ronchi ruling (with rulings perpendicular to the stage scan direction). When a Ronchi ruling is used, calculation of maximum spatial frequency as a function of position along a line parallel to the scan direction in the image of the strip is usually sufficient to find the best combination of scan speed and exposure frequency for synchronization (where the best combination of scan speed and exposure frequency coincide with the highest spatial frequency along the line).

When the best combination of scan speed and frame rate (MSIA) or charge transfer rate (TDI) has been measured for a particular magnification (zoom setting), it does not have to be adjusted again until the magnification (zoom setting) is changed.

The scan speed is synchronized with the frame rate (or charge transfer rate) when the stage moves a distance equal to the distance between pixel-positions in the specimen in a time equal to the time between successive exposures.

The invention claimed is:

1. An instrument for scanning a large microscope specimen, the instrument comprising a detector array that is part of an optical train to focus light from the specimen onto the detector array, the specimen being movable relative to the detector array, the optical train having an infinity corrected objective, the specimen being mounted on a support and moving relative to the detector array during scanning by a scanner, the instrument having a magnification that is adjustable using a zoom tube lens over a continuous range of magnification to enable scans of the specimen to be taken over a range of resolutions with the same infinity corrected objective, a rapid, low-resolution scan can be used to provide an index image for finding areas of interest, the magnification being increased with the same infinity corrected objective to allow the scanner to acquire a high resolution image of at least one of the areas of interest, the detector array being an area detector for scanning using Moving Specimen Image Averaging.

2. The instrument as claimed in claim 1 wherein the instrument is operational in fluorescence.

3. The instrument as claimed in claim 1 wherein the infinity corrected objective is a microscope objective.

4. The instrument as claimed in claim 1 wherein the area detector is used for scanning with Moving Specimen Image Averaging, the scan speed being adjusted as the magnification is adjusted.

5. The instrument as claimed in claim 1 wherein the magnification is adjustable in a series of steps.

6. The instrument as claimed in claim 1 wherein a width of scan strips can be adjusted to reduce a number of strips required to image an entire area of interest while maintaining a higher magnification than that of a low resolution preview scan.

7. The instrument as claimed in claim 1 wherein the instrument is configured to scan the large microscope specimen in fluorescence and to predict a fluorescence exposure required for higher-resolution scans.

8. The instrument as claimed in claim 1 wherein the specimen is mounted on a zoom microscope slide scanner having a parfocal zoom lens, the instrument being focused at a high magnification and the focus being maintained when zooming to a smaller magnification without varying the infinity corrected objective.

9. The instrument as claimed in claim 1 wherein the magnification is adjusted by a zoom tube lens.

10. The instrument as claimed in claim 9 wherein the zoom tube lens forms a real image of the specimen on the detector array and a physical length of the zoom tube lens increases when a focal length of the zoom tube lens increases causing an inner barrel of the zoom tube lens to extend.

11. The instrument as claimed in claim 9 wherein the zoom tube lens has an inner barrel that remains stationary at a top of an infinity space as an outer barrel of the zoom tube lens and detector array moves relative to the inner barrel as a physical length and a focal length of the zoom tube lens is adjusted.

12. The instrument as claimed in claim 9 wherein the zoom tube lens has a stepped zoom.

13. The instrument as claimed in claim 12 wherein the stepped zoom moves in equally spaced increments.

14. The instrument as claimed in claim 12 wherein the stepped zoom has a scale to indicate a plurality of positions.

15. The instrument as claimed in claim 1 wherein the specimen is moved relative to the detector array during scanning at a constant velocity.

16. A method for scanning a large microscope specimen using an instrument having a detector array that is part of an optical train to focus light from the specimen onto the detector array, the optical train having an infinity corrected objective, the method comprising moving the specimen relative to the detector array during scanning by a scanner, adjusting the magnification over a range using a zoom tube lens to enable scans of the specimen to be taken over a range of resolutions with the same infinity corrected objective, taking a rapid, low-resolution scan to provide an index image or for finding areas of interest, increasing the magnification with the same infinity corrected objective to allow the scanner to acquire a high resolution image of at least one of the areas of interest, using an area detector as the detector array and scanning using Moving Specimen Image Averaging.

17. The method as claimed in claim 16 including the steps of using the zoom tube lens to form a real image of the specimen on the detector array and increasing a physical length of the zoom tube lens as a focal length of the zoom tube lens increases.

18. The method as claimed in claim 17 including the step of increasing the physical length of the zoom tube lens by causing an inner barrel of the zoom tube lens to extend.

19. The method as claimed in claim 17 including the step of causing the physical length of the zoom tube length to adjust by adjusting the outer barrel while the inner barrel remains stationary at a top of an infinity space.

20. The method as claimed in claim 17 including the step of using a zoom tube lens with a stepped zoom.

21. The method as claimed in claim 20 including the step of causing the stepped zoom to move in equally spaced increments when the stepped zoom is adjusted.

22. The method as claimed in claim 20 including the step of locating a scale on the stepped zoom to indicate a plurality of positions, thereby enabling an operator of the instrument to return to a specific zoom position by returning to the same position on the scale.

23. The method as claimed in claim 16 including using a two dimensional detector array as the area detector.

24. The method as claimed in claim 23 including the steps of moving the scanner relative to the specimen to image an area of interest of the specimen and using the area detector to acquire images of the specimen as a function of time when the specimen is stationary relative to the detector.

25. The method as claimed in claim 16 including operating the instrument in fluorescence.

26. The method as claimed in claim 16 including the step of using a microscope objective as the infinity corrected objective.

27. The method as claimed in claim 16 including the steps of using the area detector for scanning with Moving Specimen Image Averaging and adjusting the scan speed as the magnification is adjusted.

28. The method as claimed in claim 16 including the steps of adjusting a width of scan strips to reduce a number of strips required to image an entire area of interest while maintaining a higher magnification than that of a low resolution preview scan.

29. The method as claimed in claim 16 including the steps of mounting the specimen on a zoom microscope slide scanner having a parfocal zoom lens, focusing the instrument at a high magnification and maintaining the focus when zooming to a smaller magnification without varying the infinity corrected objective.

30. The method as claimed in claim 16 including adjusting the magnification by a zoom tube lens.

31. The method as claimed in claim 16 including the step of moving the specimen at a constant velocity relative to the detector array during scanning.

32. The method as claimed in claim 16 including the steps of adjusting a focal length of the zoom tube lens of the scanner, estimating a constant frame rate using Moving Specimen Imaging Averaging.

33. The method as claimed in claim 32 including the steps of varying an exposure frequency of the scanner and keeping a speed of a scanning stage, which supports the specimen, constant relative to the detector array.

34. The method as claimed in claim 32 including the steps of varying a speed of a scanning stage, which supports the specimen, at a constant rate relative to the detector array while maintaining an exposure frequency of the scanner constant.

35. The method as claimed in claim 32 including the steps of using the scanning stage to support the specimen, and varying an exposure frequency of the scanner at a constant rate while maintaining a speed of the scanning stage relative to the detector array constant.

36. The method as claimed in claim 16 including the steps of changing the magnification to a new magnification by adjusting a focal length of the zoom tube lens of the scanner to a different focal length, estimating a different scan speed that is required for the different focal length, measuring the correct scan speed for the different focal length by either varying the scan speed at constant exposure frequency or varying the exposure frequency at constant scan speed over a range from above to below the estimated scan speed or exposure frequency respectively while measuring the sharpness of an image along a scan strip where a sharpest image will be achieved when the measured spatial frequency is a maximum.

37. The method as claimed in claim 36 including the steps of estimating the different scan speed based on one of exposure frequency and charge transfer rate and determining the correct scan speed by measuring one of exposure frequency and charge transfer rate.

38. The method as claimed in claim 37 including the steps of measuring the sharpness of the image along the scan strip by measuring and calculating a spatial frequency in the strip image as a function of scan speed or exposure frequency along the strip.

39. The method as claimed in claim 38 including the steps of determining the maximum measured spatial frequency by determining the spatial frequency when the scan speed and exposure frequency match perfectly, thereby determining the best scan speed for the new magnification.

40. The method as claimed in claim 39 including the steps of determining the best scan speed or exposure rate for the new magnification.

* * * * *